United States Patent
Gopalakrishnan et al.

(10) Patent No.: US 10,341,671 B2
(45) Date of Patent: Jul. 2, 2019

(54) METHOD AND SYSTEM FOR IMAGE COMPRESSION

(71) Applicant: Xerox Corporation, Norwalk, CT (US)

(72) Inventors: Sainarayanan Gopalakrishnan, Chennai (IN); Xing Li, Webster, NY (US); Rajasekar Kanagasabai, Chennai (IN); Clara Cuciurean-Zapan, Fairport, NY (US); Vignesh Doss, Tamil Nadu (IN)

(73) Assignee: XEROX Corporation, Norwalk, CT (US)

( * ) Notice: Subject to any disclaimer, the term of this patent is extended or adjusted under 35 U.S.C. 154(b) by 130 days.

(21) Appl. No.: 15/493,674

(22) Filed: Apr. 21, 2017

(65) Prior Publication Data

US 2018/0310011 A1 Oct. 25, 2018

(51) Int. Cl.
*H04N 1/64* (2006.01)
*H04N 19/27* (2014.01)

(52) U.S. Cl.
CPC ............ *H04N 19/27* (2014.11); *H04N 1/642* (2013.01)

(58) Field of Classification Search
None
See application file for complete search history.

(56) References Cited

U.S. PATENT DOCUMENTS

| | | | |
|---|---|---|---|
| 4,903,317 A | 2/1990 | Nishihara et al. | |
| 6,108,455 A | 8/2000 | Mancuso | |
| 7,483,581 B2 | 1/2009 | Ravenndran et al. | |
| 9,596,380 B1 | 3/2017 | Gopalakrishnan et al. | |
| 2008/0304762 A1* | 12/2008 | Matsumoto | G06K 9/38 382/243 |
| 2009/0208126 A1* | 8/2009 | Matsumoto | H04N 19/60 382/244 |
| 2009/0323089 A1* | 12/2009 | Hayasaki | H04N 1/642 358/1.9 |
| 2010/0183223 A1* | 7/2010 | Matsuoka | H04N 1/56 382/166 |
| 2011/0176728 A1* | 7/2011 | Matsuoka | H04N 1/41 382/166 |
| 2011/0255777 A1* | 10/2011 | Matsuoka | H04N 1/40062 382/164 |

(Continued)

*Primary Examiner* — Kevin Ky
(74) *Attorney, Agent, or Firm* — Fay Sharpe LLP (57) ABSTRACT

An image compression method includes compressing an input image with first and second compression methods to generate first and second (e.g., lossless and lossy) compressed images. First and second residual layers are generated, based on a difference between the first and second compressed images. Connected components in the residual layers are identified. Each connected component includes a group of one or more pixels that, when mapped to the second compressed image is connected, in first and second directions, to pixels in the second compressed image. A compressed image is generated, which includes, for a connected component identified in the first residual layer, removing corresponding pixels from the second compressed image, and for a connected component identified in the second residual layer, adding corresponding pixels to the second compressed image. The system and method can thus provide file size savings associated with lossy compression while avoiding character replacement.

19 Claims, 8 Drawing Sheets

(56) References Cited

U.S. PATENT DOCUMENTS

| | | | |
|---|---|---|---|
| 2012/0134581 A1* | 5/2012 | Matsuda | H04N 1/41 382/164 |
| 2015/0045928 A1 | 2/2015 | Perez et al. | |
| 2018/0122080 A1* | 5/2018 | Zaitsev | G06T 7/174 |

* cited by examiner

RESIDUAL LAYER - 1 (BLOBS WHICH ARE ADDED IN THE LOSSY COMPRESSION)

RESIDUAL LAYER - 2 (BLOBS WHICH ARE REMOVED IN THE LOSSY COMPRESSION)

BLOCKED CHANGES (THE BLOBS WHICH CAN CAUSE CHARACTER REPLACEMENT)

FIG. 8

METHOD AND SYSTEM FOR IMAGE COMPRESSION

BACKGROUND

The embodiments disclosed herein relate to image processing and, more particularly, to methods and systems for image compression.

Digital images are often captured at high-resolution. Storing and transmitting large data files such as these can thus require larger storage space and more bandwidth than for low-resolution images. The size of the images can be reduced using an image compression technique. However, this generally entails a trade-off between the size and the quality of the resulting image.

Various image compression techniques are available. The Joint Bi-level Image Experts Group (JBIG2) standard, for example, provides an image compression algorithm for 1 bit (binary) images that can be used in a lossless or lossy compression. In operation, a JBIG2 encoder segments the input page into regions of text, regions of halftone images, and regions of other data. To compress the binary, textual regions, the foreground (e.g., black) pixels in the regions are grouped into symbols. A dictionary of symbol templates (patterns) is generated and used to describe the locations of identified symbols. The dictionary may be encoded using Huffman or Arithmetic coders. For lossy compression, any differences between similar symbols (e.g., slightly different impressions of the same letter) are ignored, while for lossless compression, this difference is taken into account. For lossless compression, the dictionary is created based on exact matching between the symbol and a template. Similar symbols that are not an exact match are compressed using another symbol as a template. In the lossy mode, the dictionary is created and updated based on the closest match between the symbol and a dictionary template, using thresholding.

In lossy compression, the file size is lower than for lossless compression, but there are risks of character replacement. Since this is undesirable, the lossy compression option has often been avoided. As a result, the savings in file size between a low quality setting and a high quality setting has not been as great.

A method which takes advantage of lossy compression but also minimizes character replacement is desirable.

INCORPORATION BY REFERENCE

U.S. Pat. No. 9,596,380, issued Mar. 14, 2017, entitled METHODS AND SYSTEMS FOR IMAGE COMPRESSION, by Gopalakrishnan, et al., the disclosure of which is hereby incorporated herein by reference, describes an image compression method. An original image is first compressed to generate a modified image. Then, first and second residual layers are generated by comparing the modified image to the original image. The first and second residual layers include pixels added/removed to the original image during the compression. The first and second residual layers are filtered and compressed to generate respective compressed first and second residual layers. A second compressed image is generated, based on the modified image and the compressed first and second residual layers. In this method, the two residual layers and modified layer have to be maintained in order to reconstruct the image in decoding.

BRIEF DESCRIPTION

In accordance with one aspect of the exemplary embodiment, an image compression method includes compressing an input image with a first compression method to generate a first compressed image and compressing the input image with a second compression method to generate a second compressed image. The method includes generating at least one of a first residual layer comprising first pixels corresponding to foreground pixels that are present in only the second of the first and second compressed images, and a second residual layer comprising second pixels corresponding to foreground pixels that are present in only the first of the first and second compressed images. Connected components, where present, are identified in the at least one of the first and second residual layers. Each connected component includes a group of first or second pixels in the respective first or second residual layer that, when mapped to the second compressed image is connected, in at least one of first and second directions, to foreground pixels in the second compressed image. An output compressed image is generated, which includes at least one of a) for a connected component identified in the first residual layer, removing at least one corresponding foreground pixel from the second compressed image, and b) for a connected component identified in the second residual layer, adding at least one corresponding foreground pixel to the second compressed image.

One or more steps of the method may be implemented by a processor.

In accordance with another aspect of the exemplary embodiment, an image compression system is provided. The system includes an encoder including a first compression component, which compresses an input image by a first compression method to generate a first compressed image, and a second compression component, which compresses the input image with a second compression method to generate a second compressed image. A residual layer generating component generates at least one of: a) a first residual layer comprising first pixels corresponding to foreground pixels that are present only in the second of the first and second compressed images, and b) a second residual layer comprising second pixels corresponding to foreground pixels that are present only in the first of the first and second compressed images. A connectivity computation component is configured for identifying connected components, where present, in the at least one of the first and second residual layers. Each identified connected component in the first residual layer includes a group of first pixels in the first residual layer that, when mapped to the second compressed image, is connected, in at least one of first and second directions, to pixels in the second compressed image. Each connected component in the second residual layer includes a group of second pixels in the second residual layer that is connected, in at least one of first and second directions, to pixels in the second compressed image. A composition component generates an output compressed image based on the second compressed image in which at least one of: a) at least one foreground pixel is removed from the second compressed image corresponding to a connected component identified in the first residual layer and b) at least one foreground pixel is added to the second compressed image corresponding to a connected component identified in the second residual layer. A processor implements the components.

In accordance with another aspect of the exemplary embodiment, an image compression method includes compressing an input image with a lossless compression method to generate a first compressed image and compressing the input image with a lossy compression method to generate a second compressed image. A difference is computed between the first and second compressed images. Based on the difference, a first residual layer comprising first pixels and a second residual layer comprising second pixels are generated. Connected components, where present, are identified in the first and second residual layers. Each connected component includes a group of first or second pixels in the respective first or second residual layer that, when mapped to the second compressed image, is connected, in first and second directions, to pixels in the second compressed image. An output compressed image is generated. This includes at least one of removing pixel(s) from the second compressed image corresponding to any connected components identified in the first residual layer, and adding pixel(s) to the second compressed image corresponding to any connected components identified in the second residual layer. The resulting compressed image is output.

One or more steps of the method may be implemented by a processor.

DETAILED DESCRIPTION

Embodiments described herein provide a system and method for compression of images, which minimizes character substitution while also enabling substantial file size saving, as compared to lossless compression techniques. The compression method may be implemented using a combination of first and second binary compression methods, such as JBIG2 lossless compression and JBIG2 lossy compression.

As used herein, an "image" refers to a collection of data, including image data in any format, retained in an electronic form. In an embodiment, the image may correspond to a pictorial representation of an object or a document, such as a text document. In general an image includes an array of pixels. In a binary image, each pixel is either on or off (black or white). Halftone images can be converted to binary images prior to compression. A "text image" refers to an image, or a segmented part of an image, that includes a sequence of symbols.

"Image compression" refers to a technique that reduces the size of an image by removing some of the image data, in particular, redundant and/or irrelevant image data. Image compression may be lossy or lossless. A lossy compression of the image includes removal of information determined to be redundant and/or irrelevant from the image. In general, the removed information may not be recovered during the decompression of the lossy compressed image. A lossless compression of the image reduces the size of the image while retaining the image information. In a lossless compression, the compressed image can be recovered by decompression.

A "compressed image" refers to an image that is obtained when a compression technique, such as a lossy or lossless compression technique, is applied on an original image.

A "first residual layer" refers to an image layer generated based on a comparison between a lossy compressed image and a lossless compressed image and which includes one or more pixels added to an original image during the lossy compression.

A "second residual layer" refers to an image layer generated based on the comparison between the lossy compressed image and the lossless compressed image and which includes one or more pixels removed from the original image during the lossy compression.

Figure 1:
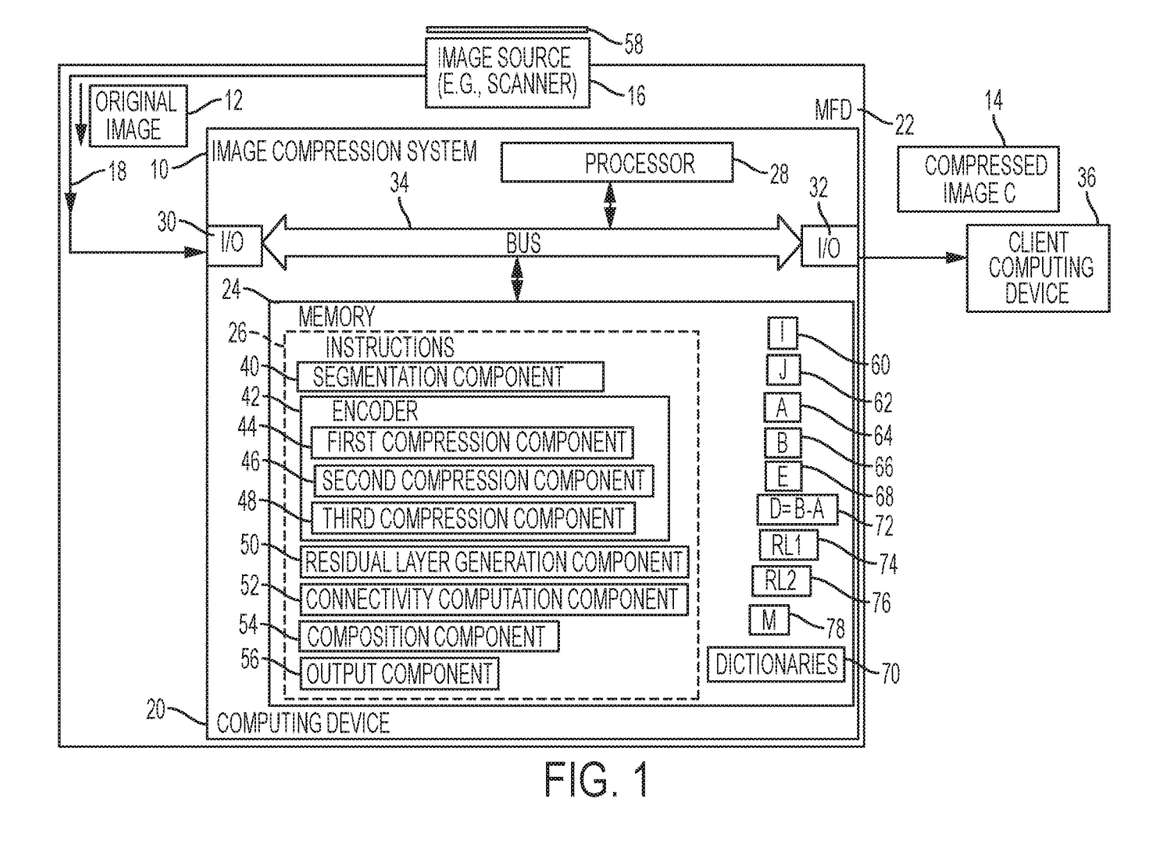
FIG. 1 is a functional block diagram of an image compression system in accordance with one aspect of the exemplary embodiment.

FIG. 1 is a functional block diagram of an environment in which a computer-implemented image compression system 10 operates. The system receives as input an original image 12 and outputs a compressed image 14 derived from the original image using the method described with reference to FIGS. 2 and 3. The original image may be received from any suitable image source 16, such as a scanner (which may form a part of a multifunction device having additional functions to scanning, such as printing and/or faxing), a client computer, a portable memory device, or the like, via a wired or wireless link 18, such as a wire or a local or wide area network, such as the Internet. System 10 may be hosted by one or more computing devices, such as the illustrated computing device 20 which may be associated with the image source 16 (e.g., part of a scanning device or multifunction device (MFD) 22 which incorporates the scanner 16, or may be a remote computing device, such as a server computer. In addition to the hardware and software for performing scanning, an MFD may include hardware and/or software components for performing other functions, such as printing and/or faxing.

Figure 2:
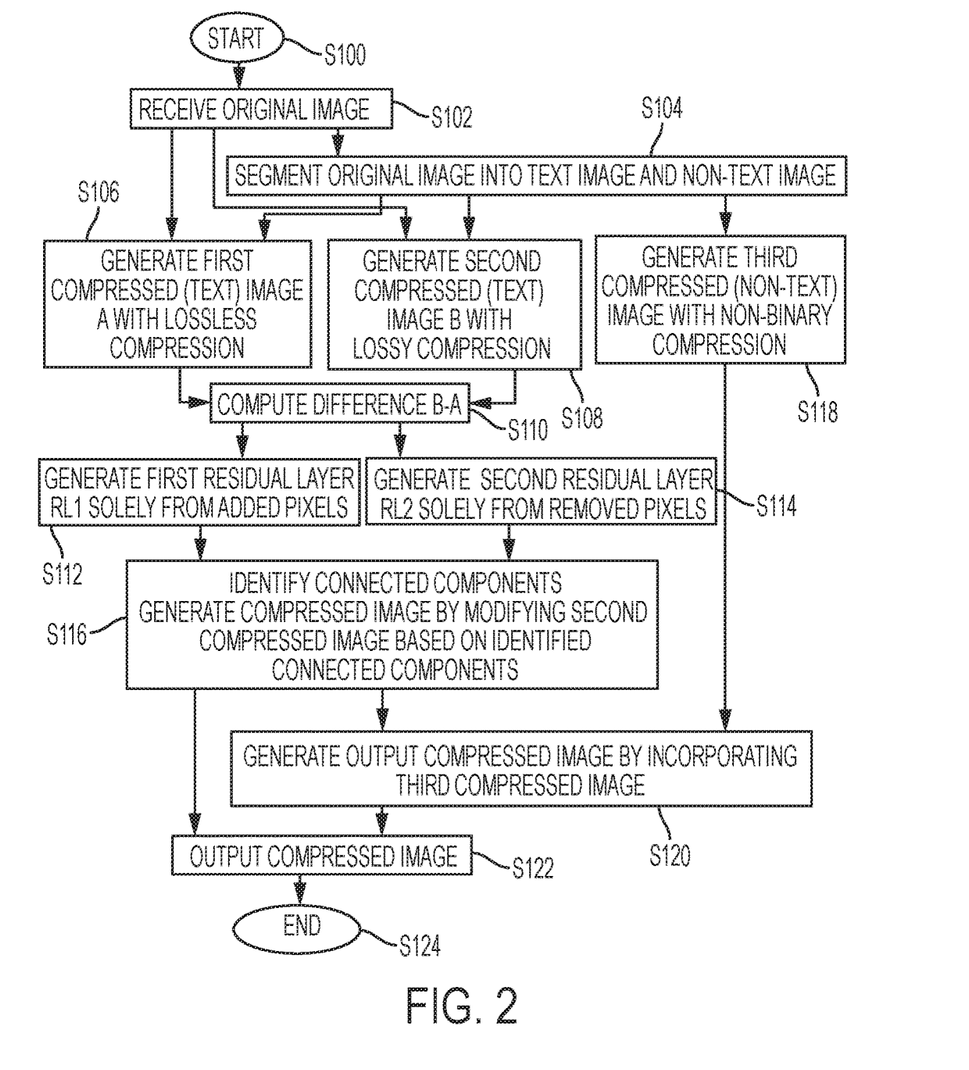
FIG. 2 is a flowchart illustrating a method for compressing an image, in accordance with another aspect of the exemplary embodiment.
Figure 3:
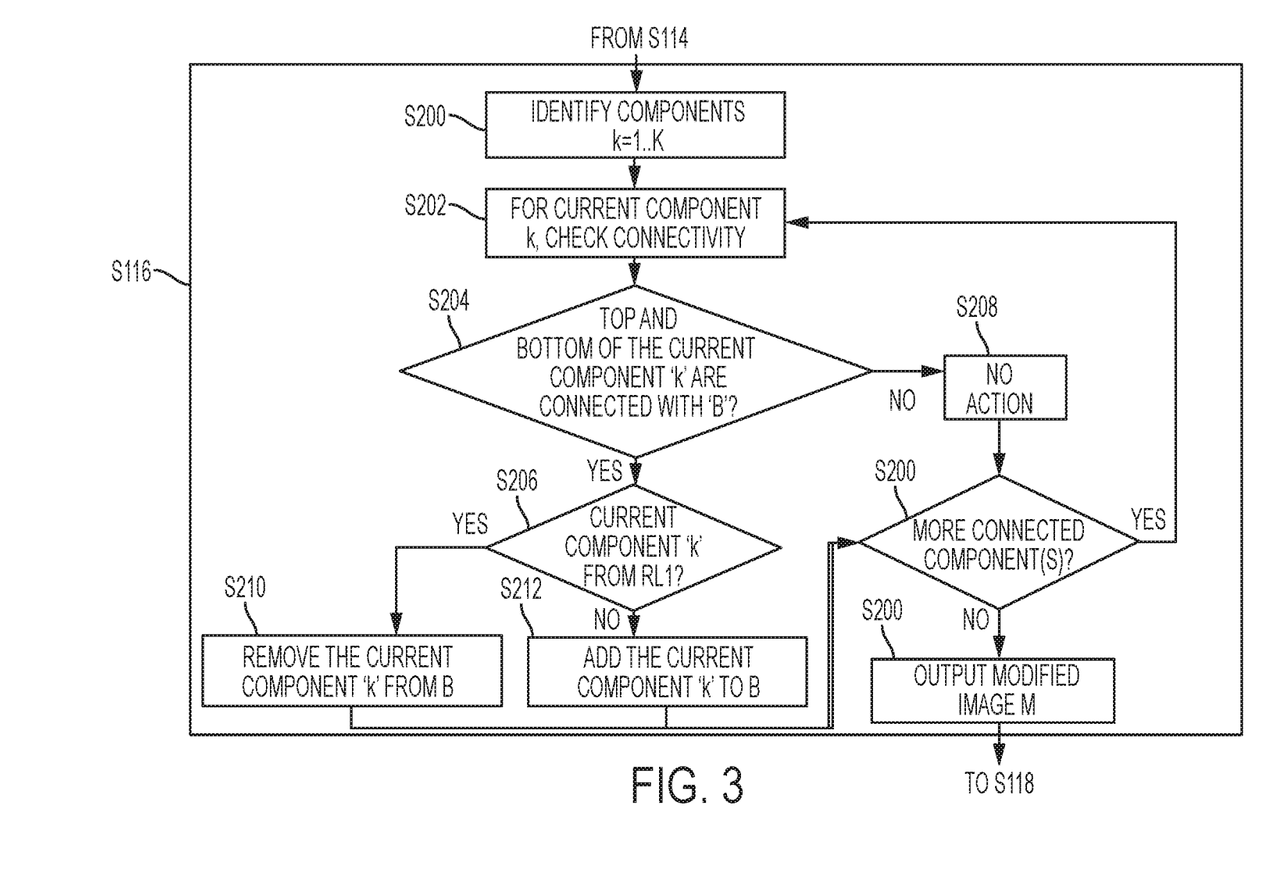
FIG. 3 illustrates aspects of the method of FIG. 2.

The system 10 includes memory 24 which stores software instructions 26 for performing the image compression method described in FIGS. 2 and 3, and a processor 28, in communication with the memory, for executing the instructions 26. One or more input/output components 30, 32 allow the system to communicate with external devices, such as the image source 16. Hardware components 24, 28, 30, 32 of the system may be communicatively connected by a data/control bus 34. The compressed image 14 may be output from the system 10 to a client computing device 36. In other embodiments, the system 10 is hosted by the client device 36.

The memory 24 may represent any type of non-transitory computer readable medium such as random access memory (RAM), read only memory (ROM), magnetic disk or tape, optical disk, flash memory, or holographic memory. In one embodiment, the memory 24 comprises a combination of random access memory and read only memory. In some embodiments, the processor 28 and memory 24 may be combined in a single chip. Memory 24 may store the processed image data as well as the instructions for performing the exemplary method. The network interface 32 (and/or 30) allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 28 can be variously embodied, such as by a single-core processor, a dual-core processor (or more generally by a multiple-core processor), a digital processor and cooperating math coprocessor, a digital controller, or the like. In addition to executing the software instructions described herein, the processor 28 may control the operation of the scanner 16 and/or MFD 22.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 26 include an optional segmentation component 40, an encoder 42, which includes a first compression component 44, a second compression component 46, and optionally, a third compression component 48, a residual layer (RL) generation component 50, a connectivity computation component 52, a composition component 54, and an output component 56. In one embodiment, the instructions 26 also include instructions for operating the scanner 16 to scan a hardcopy document 58 to generate the image 12.

Figure 4:
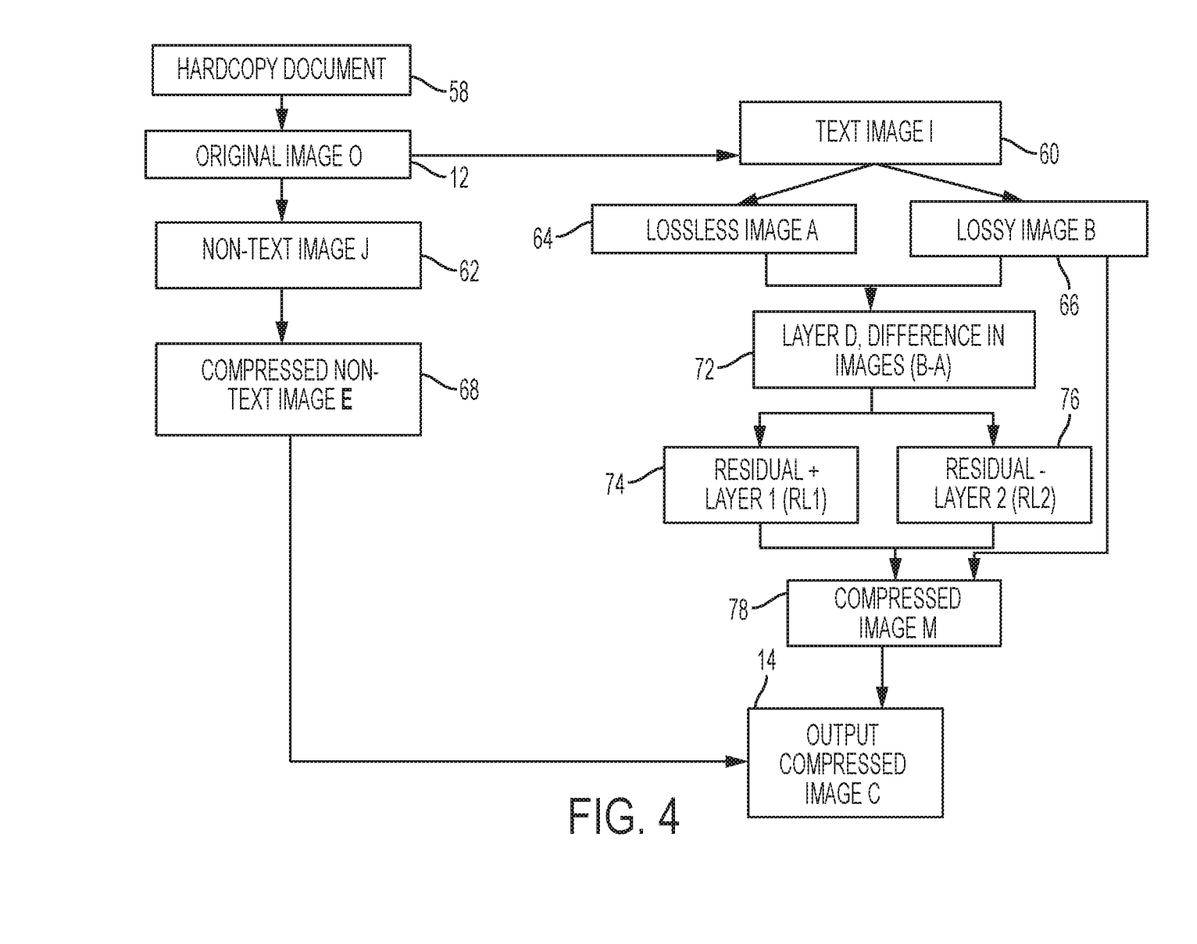
FIG. 4 schematically illustrates image data generated in the exemplary method.

With reference also to FIG. 4, the optional segmentation component 40 segments the original image 12 into a text image (I) 60 (which may also be referred to as an input image) and a non-text image (J) 62. If the segmentation component 40 is omitted, the original image 12 is processed in the same manner as the text image 60.

The first compression component 44 performs a first type of compression on the input image (I) 60, to produce a first compressed image, such as lossless image (A) 64. Image 64 has a reduced file size (e.g., as measured in megabytes) as compared to image 60. In one embodiment, the first type of compression is a binary lossless compression, for example, using the JBIG2 lossless compression standard.

The second compression component 46 performs a second type of compression on the input image (I) 60, to produce a second compressed image, such as lossy image (B) 66. Image (B) 66 has a reduced file size as compared to image 60, and generally also with respect to the lossless image 64. In one embodiment, the second type of compression is a binary lossy compression of the text image 60, e.g., using the JBIG2 lossy compression standard The optional third compression component 48 performs a third type of compression, e.g., a JPEG compression, on the non-text portions 62 of the original image 12 to generate a third compressed (non-text) image (E) 68.

The lossless compression may be performed as follows: the foreground ("on", e.g., black) pixels in the image 60 are grouped into symbols. Typically, a symbol will correspond to a character of text, but this is not required. A dictionary 70 of symbols is created and encoded as a set of templates, e.g., using context-dependent arithmetic encoding. However, other encoding methods suitable for binary encoding, such as Huffman encoding may alternatively be used. The image 60 is encoded by associating at least some of the symbols with respective ones of the templates in the dictionary. These are symbols for which there is an exact match with a template. In the case of a different symbol (one that does not exactly match any of the templates), the most similar symbol (matching one of the templates) is identified and the different symbol is compressed using the identified similar symbol as a template.

The lossy compression may be performed as follows: the foreground ("on", e.g., black) pixels in the image 60 are grouped into symbols, as for the lossless method. A dictionary 70 of symbols is created and encoded as a set of templates, e.g., using context-dependent arithmetic encoding. The image 60 is encoded by associating each of the symbols in the image 60 with a respective most similar one of the templates in the dictionary, even if it does not exactly match that template.

Halftone images may be compressed by reconstructing the grayscale image used to generate the halftone image and then sending this image together with a dictionary of halftone patterns.

The residual layer generation component 50 compares the lossy and lossless images, which includes computing a difference (B-A) 72 between the lossy image B 66 and the lossless image A 64 (i.e., after any symbol replacement has occurred). The difference 72 may be computed on decompressed versions of the lossy and lossless images. Thus foreground ("on") pixels in B that are also foreground in A will have a difference 1−1=0; foreground pixels in B that are background ("off") in A will have a difference 1-0=1 (these are pixels added by the lossy compression); background pixels in B that are foreground in A will have a difference 0−1=−1 (these are pixels removed by the lossy compression); and background pixels in B that are also background pixels in A will have a difference 0−0=0 (this last difference need not be computed). Thus, each pixel in difference layer D 72 will have a value of −1, 0, or +1. From the difference layer 72, first and second residual layers 74 and 76 are generated. The first residual layer 74 consists of the pixels that are added to the input image 60 by the lossy compression, specifically, only those pixels with a computed difference of +1, which are referred to herein as first pixels. The second residual layer 76 consists of the pixels that are removed from the image 60 by the lossy compression (but not by the lossless compression), specifically, only those pixels with a computed difference of −1, which are referred to herein as second pixels. The first residual layer 74 is thus a binary image in which the foreground ("on") first pixels are those with a computed difference of +1, while the rest of the pixels are "off" (dr vice versa). Similarly, the second residual layer 76 is a binary image in which the foreground ("on") second pixels are those with a computed difference of −1, while the rest of the pixels are "off" (or vice versa).

The connectivity component 52 identifies components in the one or both of the residual layers 74, 76 which are connected components, i.e., components that may impact character replacement. Each component k is a group of one or more contiguous pixels (a blob) in a respective one of the residual layers 74, 76. While a threshold may be placed on the minimum number of connected pixels in each identified component (such as at least two, or at least four pixels), in the exemplary embodiment, no threshold is placed on the number. In the case of layer 74, the components consist of first pixels and in the case of layer 76, the components consist of second pixels. The decision on whether a given component k, from one of the residual layers, is a connected component is made by comparing component k with the lossy image B 66 (essentially, superimposing the connected component on the lossy image) to determine whether the component k is connected, in at least one (or both) of two opposite directions, to pixels in the lossy image B. If so, then component k is considered a connected component. For example, connectivity is evaluated in two opposite directions which may be top and bottom connections, although right and left connections could alternatively or additionally be considered, based on the document/text orientation. In the exemplary system and method, therefore, connected component analysis is used on the residual blobs against the respective template in the lossy compression to determine whether to encode the differences or not.

The composition component 54 generates a compressed image M 78, based on the lossy image 66 and the identified connected components. It is assumed that a connected component k may cause character replacement. If the connectivity can make a character replacement, the lossless symbol, or a respective part thereof, is retained. If the component k lacks connectivity, it is assumed that it does not cause the character replacement. In this case, the lossy symbol, or a respective part thereof, is retained. The composition component 54 therefore generates a modified image M 78 by removing from (respectively, adding to) the lossy image 66, the connected components k from the first residual layer 74 (respectively, second residual layer 76).

As an example, suppose that the number "6" In the input image does not exactly match one of the templates but is closest to (has most matching pixels to) a template corresponding to the number "8". Then for lossy compression, the "8" template is used for compression, while for lossless compression, a similar symbol, such as a slightly different "6," is used for compression. In this case, the first residual layer will have a blob of first pixels that were not in the input image. On finding that this blob is connected, in top and bottom directions, to parts of the "8" in the lossy image, it can be assumed that this connected component could have caused a character replacement, and is removed from the lossy image and/or replaced with pixels from the corresponding location in the lossless image.

If segmentation has been performed, the modified, compressed image 78 is combined with the compressed image E 68 to form the compressed image C 14. Otherwise, modified image 78 serves as the compressed image 14.

The output component 56 outputs the compressed image 14.

FIG. 2 is a flowchart illustrating a method of image compression, which may be performed with the system of FIG. 1. The method begins at S100.

At S102, an original digital image 12 is received. In one embodiment, the original image 12 is a scanned image generated by scanning a hardcopy document 58 with the scanner 16.

At S104, the original image 12 is optionally segmented to generate text and non-text images 60, 62. Other preprocessing may alternatively or additionally be performed, such as denoising of the original image.

At S106, a first compressed image 64 is generated, from the input image 12 (or 60, where generated), using a first binary compression method, specifically, lossless compression. This may be performed by the first compression component 44.

At S108, a second compressed image 66 is generated, from the input image 12 (or 60, where generated), using a second binary compression method, specifically, lossy compression. This may be performed by the second compression component 46.

At S110, a difference 72 is computed between the second compressed image 66 and the first compressed image 64 to identify foreground pixels occurring in one but not both of the compressed images 64, 66. This may be performed by the residual layer generation component 50. As will be appreciated, since the lossless and lossy compressed images (when decompressed) have the same number of pixels and scanlines, this step may simply entail decompressing the compressed images 64, 66 and then comparing each "on" pixel of the second compressed image with the corresponding pixel of the first compressed image to determine whether that pixel is different, i.e., "off", and also comparing each "on" pixel of the first compressed image with the corresponding pixel of the second compressed image to determine whether that pixel is different, i.e., "off". Each difference is stored.

At S112, a first residual layer 74 is generated, based on the computed difference, which includes first pixels. These correspond to "on" pixels in the second compressed image 66 that are not "on" in the first compressed image 64. This step may be performed by the residual layer generation component 50.

At S114, a second residual layer 76 is generated, based on the computed difference, which includes second pixels. These pixels correspond to "on" pixels in the first compressed image 64 that are not "on" in the second compressed image 66. In one embodiment, one of steps S112 and S114 is omitted, such that only one residual layer is subsequently processed.

At S116, connected components in the first and/or second residual layers 74, 76 are identified, where present, by the connectivity computation component. A compressed image 78 is generated by replacing the corresponding pixel(s) in the second compressed image 66 with pixel(s) from the first compressed image 64, based on the identified connected component(s). This may include, for a connected component identified in the first residual layer, removing at least one corresponding foreground pixel from the second compressed image, and/or for a connected component identified in the second residual layer, adding at least one corresponding foreground pixel to the second compressed image.

If segmentation has been performed, at S118, a third compression method is used to generate a compressed image 68 from the non-text image 62. At S120, the compressed images 68, 78 may be combined to generate the compressed image 14. Otherwise compressed image 78 serves as the compressed image 14.

At S122, the compressed image 14 may be output, optionally after further processing, e.g., to the client device 36.

The method ends at S124.

With reference to FIG. 3, S116 may proceed as follows:

At S200, a set of components k=1, ..., K is identified in the residual layers 74, 76.

At S202, for a current component, k its connectivity is evaluated to determine if it is connected to pixels in the second compressed image 66. This includes mapping the current component, k onto the corresponding location in the second compressed image 66 and determining whether the mapped component k is connected, in two opposite directions to pixels in the second compressed image 66.

If so, at S204, the method proceeds to S206, otherwise to S208.

At S206, if the current component k (now considered a connected component) is from the first residual layer 74, the method proceeds to S210, otherwise to S212.

At S210, the current connected component k (from residual layer 74) is removed from the second compressed image 66. A set of one or more of the first pixels is thus removed from the respective template in the lossy compressed image. First pixels that do not form a part of a connected component in residual layer 74 are not removed from the second compressed image 66 (i.e., are retained in image 14).

Otherwise, at S212, the current connected component k (from residual layer 76) is added to the second compressed image 66. A set of one or more of the second pixels is thus added to the respective template in the lossy compressed image. Second pixels that do not form a part of a connected component in residual layer 76 are not added to the second compressed image 66 (i.e., are ignored).

As will be appreciated, the method may be performed incrementally, by considering each symbol as it is encoded by the first and second compression methods, rather than after lossy encoding all of the symbols. The lossy encoding of each symbol can be considered as a conditional encoding, since it is subject to the possibility of a subsequent modification. The aim of the method is to compensate for situations where improper character substitution occurs.

The method illustrated in FIGS. 2 and 3 may be implemented in a computer program product (or products) that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the compression method.

As will be appreciated, the method does not guarantee that all cases of potential character replacement are avoided. However, as shown in the Examples below, significant improvements over existing lossy compression methods can be achieved.

The output of the method is effectively a combination of the lossy and lossless images. The pixels which could cause character replacement will be taken from lossless image and the rest of the pixels from the lossy image. This hybrid approach gives higher compression than lossless compression.

One advantage of the system and method is that it allows for further reduction in file size, as compared to the method described in U.S. Pat. No. 9,596,380.

Another advantage is that the residual layers 74, 76 can be computed at the same time from the difference between the lossy and lossless images.

Without intending to limit the scope of the exemplary embodiment, the following examples illustrate application of the method to image compression of scanned images.

EXAMPLES

Figure 5:
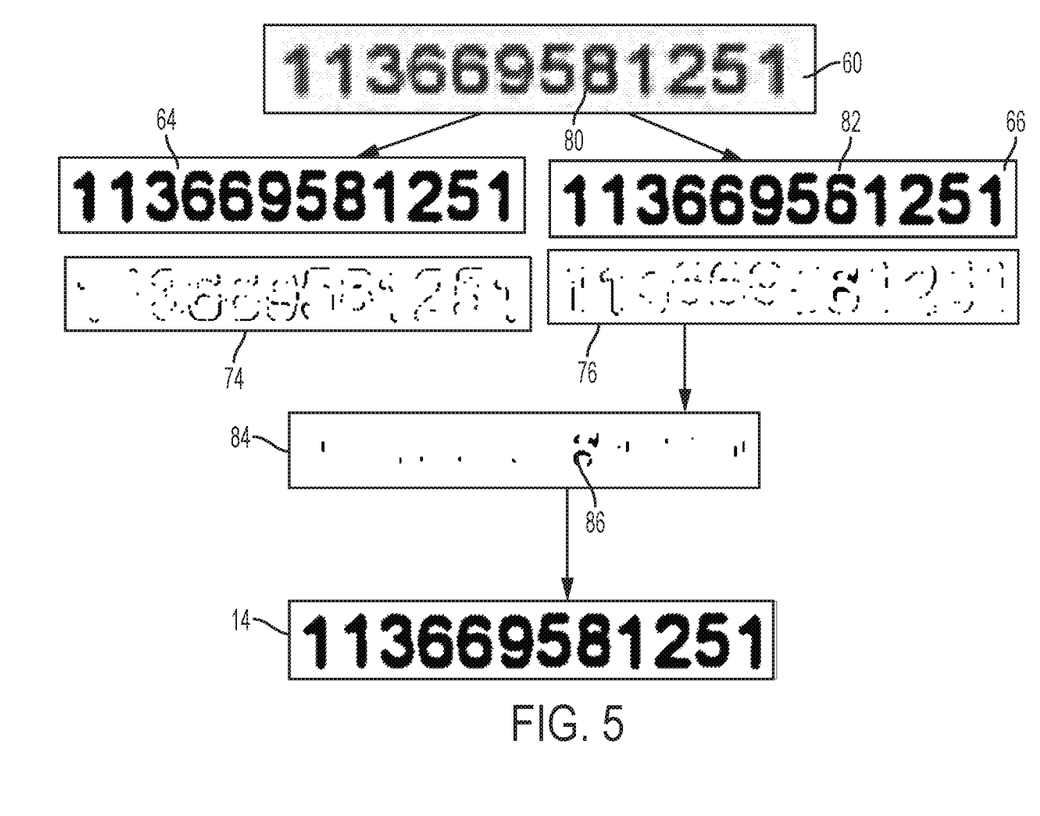
FIG. 5 illustrates image processing of a first sample text image.

Compression is performed on text images (Samples 1 and 2) according to the method described above, using JBIG2 lossy and lossless compression as the first and second compression methods. FIG. 5 shows the input image 60 for Sample 1. This is an image of a character string, specifically a sequence of numerals, "113669581251". The lossless encoding 64 does not result in any character substitutions, but is a relatively large file, compared to the corresponding lossy image 66. However, the lossy encoding results in the replacement of the original symbol, numeral "8" with a different numeral "6", as shown at 80 and 82, respectively. In the coding process, the first pixels that are added to the original symbol 80 during the lossy compression process are stored in the first residual layer 74 and the second pixels that are removed from the original symbol 80 are maintained in the second residual layer 76. The connected components in layers 74 and 76 are identified. As an example, layer 84 shows the components from layer 76 which have been determined to be connected components (having top and bottom connections to foreground pixels in the lossy image). The first pixels forming these connected components are then added to the lossy compressed image 66 in generating the output image 14.

Figure 6:
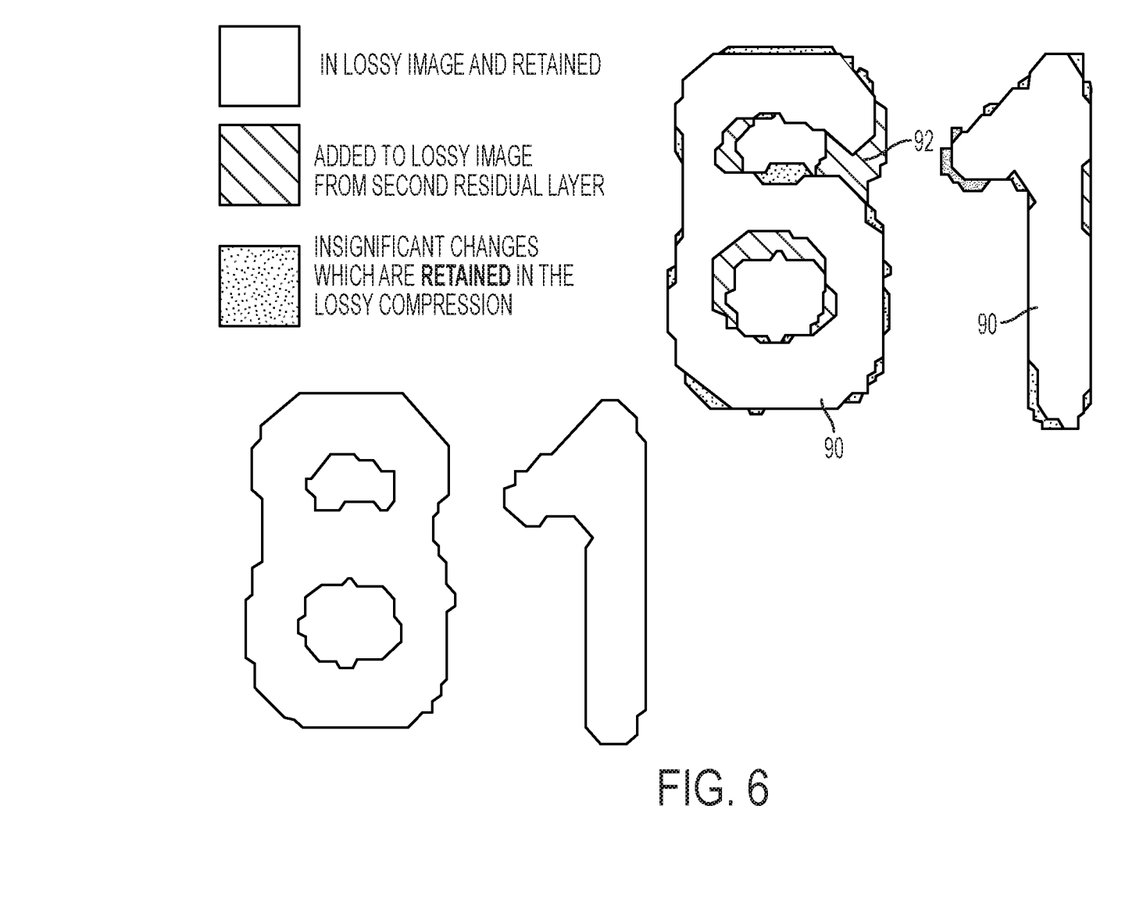
FIG. 6 is an enlarged view of two of the symbols following compression, showing incorporation of pixels from the lossless image into the lossy image.

FIG. 6 shows an enlarged view of two of the numerals showing the modifications made. Regions 90 are in the both the lossy image 66 and lossless image 64 and remain unchanged in the output image 14. Regions 92 are not in the lossy image and are added to it. These pixels are mapped from the lossless image. Regions 94 correspond to insignificant changes (unconnected components) and are retained in the lossy image.

Figure 7:
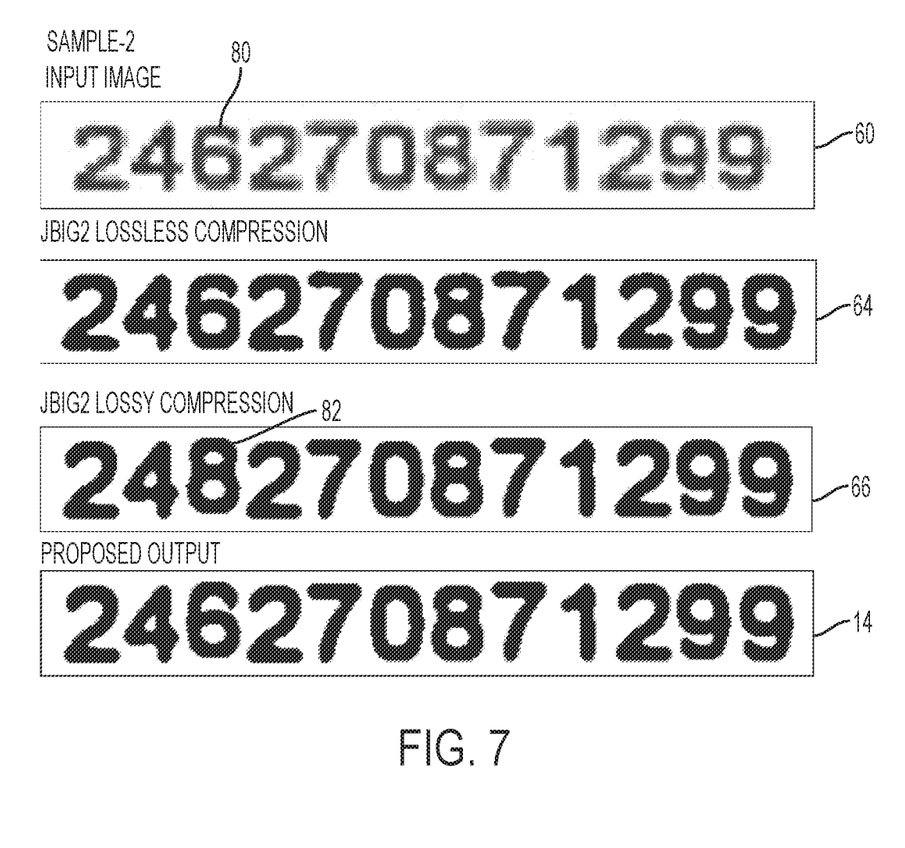
FIGS. 7 and 8 illustrate image processing of a second sample text image.
Figure 8:
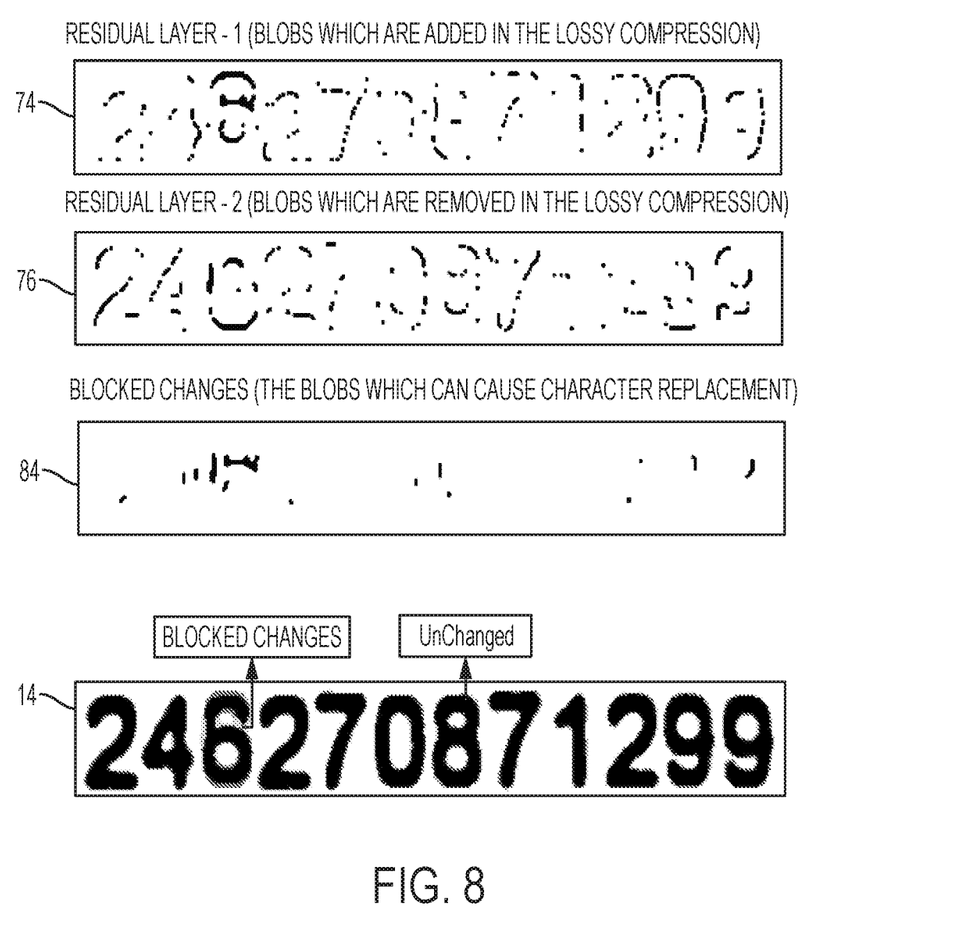

FIGS. 7 and 8 illustrate the corresponding process for Sample 2, but in this case, the lossy compression results in adding pixels to the original numeral "6". The added pixels that form connected components in the first residual layer are removed from the lossy image in generating the output 14. As illustrated in FIG. 8, this results in only the connected components being removed, while unconnected components are left unchanged in the output.

TABLE 1 shows the output file size of the present method and the % of file size saved as compared to lossless compression.

TABLE 1

| DPI | Sample | Lossy (KB) | Lossless (KB) | Present (KB) | % of File Saving |
|---|---|---|---|---|---|
| 300 | 1 | 52.4 | 154 | 94.3 | 38.76623377 |
|  | 2 | 32.4 | 155 | 120 | 22.58064516 |

The present method therefore shows considerable reduction in file size, when compared with lossless compression.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image compression method comprising:
compressing an input image with a first compression method to generate a first compressed image;
compressing the same input image with a second compression method to generate a second compressed image;
comparing the generated first compressed image and the generated second compressed image and, based on the comparison, generating:
a first residual layer comprising first pixels corresponding to foreground pixels that are present in only the second of the first and second compressed images, and
a second residual layer comprising second pixels corresponding to foreground pixels that are present in only the first of the first and second compressed images;
identifying connected components, where present, in the at least one of the first and second residual layers, each connected component comprising a group of first or second pixels in the respective first or second residual layer that, when mapped to the second compressed image is connected, in at least one of first and second directions, to foreground pixels in the second compressed image;
generating an output compressed image comprising at least one of:
for a connected component identified in the first residual layer, removing at least one corresponding foreground pixel from the second compressed image, and
for a connected component identified in the second residual layer, adding at least one corresponding foreground pixel to the second compressed image.

2. The method of claim 1, wherein at least one of the compressing of the input image, generating the at least one of the first and second residual layers, identifying connected components, and generating the output compressed image is performed with a processor.

3. The method of claim 1, wherein the first compression method is a lossless compression method and the second compression method is a lossy compression method.

4. The method of claim 1, wherein the second compression method results in a smaller image file than the first compression method.

5. The method of claim 1, wherein the method includes identifying connected components, where present, in the first and second residual layers.

6. The method of claim 1, wherein the comparing of the generated first compressed image and the generated second compressed image comprises computing a difference between the second compressed image and the first compressed image.

7. The method of claim 1, wherein the input image is a text image.

8. The method of claim 7, further comprising generating the input image by segmenting an original image to generate the text image and a non-text image.

9. The method of claim 8, further comprising compressing the non-text image with a third compression method to form a third compressed image and incorporating the third compressed image into the output image.

10. The method of claim 1, wherein the at least one of first and second directions comprises first and second directions.

11. The method of claim 10, wherein the first and second directions are opposite directions.

12. The method of claim 1, further comprising scanning a hardcopy document to generate a scanned image, the input image being the scanned image or an image generated therefrom.

13. The method of claim 1, further comprising outputting the output compressed image.

14. A system comprising memory which stores instructions for performing the method of claim 1 and a processor in communication with the memory which executes the instructions.

15. A computer program product comprising non-transitory memory storing instructions, which when executed by a computer processor, perform the method of claim 1.

16. An image compression system comprising:
an encoder comprising:
a first compression component which compresses an input image by a first compression method to generate a first compressed image, and
a second compression component which compresses the same input image with a second compression method to generate a second compressed image;
a residual layer generating component which compares the first and second compressed images and, based on the comparison, generates:
a first residual layer comprising first pixels corresponding to foreground pixels that are present only in the second of the first and second compressed images, and
a second residual layer comprising second pixels corresponding to foreground pixels that are present only in the first of the first and second compressed images;
a connectivity computation component configured for identifying connected components, where present, in the at least one of the first and second residual layers, each identified connected component in the first residual layer comprising a group of first pixels in the first residual layer that, when mapped to the second compressed image, is connected, in at least one direction, to pixels in the second compressed image, each connected component in the second residual layer comprising a group of second pixels in the second residual layer that is connected, in at least one direction, to pixels in the second compressed image;
a composition component which generates an output compressed image based on the second compressed image in which at least one of:
foreground pixels are removed from the second compressed image corresponding to a connected component identified in the first residual layer; and
foreground pixels are added to the second compressed image corresponding to a connected component identified in the second residual layer; and
a processor which implements the components.

17. The image compression system of claim 16, further comprising:
a segmentation component which segments an original image into the input image and a non-text image; and
the encoder further comprising a third compression component which compresses the non-text image by a third compression method to generate a third compressed image, which is incorporated into the output compressed image.

18. A multifunction device comprising the image compression system of claim 16 and a scanner in communication with the system.

19. An image compression method comprising:
compressing an input image with a lossless compression method to generate a first compressed image;
compressing the input image with a lossy compression method to generate a second compressed image;
after generating the first and second compressed images, computing a difference between the generated first and second compressed images;
based on the difference, generating a first residual layer comprising first pixels corresponding to foreground pixels that are present in only the second of the first and second compressed images and a second residual layer comprising second pixels corresponding to foreground pixels that are present in only the first of the first and second compressed images;
identifying connected components, where present, in the first and second residual layers, each connected component comprising a group of first or second pixels in the respective first or second residual layer that, when mapped to the second compressed image is connected, in first and second directions, to pixels in the second compressed image;
generating an output compressed image, comprising at least one of:
  removing at least one pixel from the second compressed image corresponding to a connected component identified in the first residual layer, and
  adding at least one pixel to the second compressed image corresponding to a connected component identified in the second residual layer; and
outputting the output compressed image.

* * * * *